United States Patent
Hollabaugh et al.

(10) Patent No.: US 9,288,777 B2
(45) Date of Patent: Mar. 15, 2016

(54) METHODS AND APPARATUS FOR SYNCHRONIZING CLOCK SIGNALS IN A WIRELESS SYSTEM

(75) Inventors: James M. Hollabaugh, San Jose, CA (US); Girault W. Jones, Jr., Los Gatos, CA (US)

(73) Assignee: APPLE INC., Cupertino, CA (US)

(*) Notice: Subject to any disclaimer, the term of this patent is extended or adjusted under 35 U.S.C. 154(b) by 631 days.

(21) Appl. No.: 13/604,275

(22) Filed: Sep. 5, 2012

(65) Prior Publication Data

US 2013/0301635 A1  Nov. 14, 2013

Related U.S. Application Data

(60) Provisional application No. 61/646,207, filed on May 11, 2012.

(51) Int. Cl.
*H04W 56/00* (2009.01)

(52) U.S. Cl.
CPC .................. *H04W 56/0035* (2013.01)

(58) Field of Classification Search
CPC ....... H04W 4/02; H04W 4/023; H04W 84/18; H04L 67/10
USPC ................. 370/350; 455/456.3; 707/610, 624
See application file for complete search history.

(56) References Cited

U.S. PATENT DOCUMENTS

| 6,532,274 | B1 | 3/2003 | Ruffini |
| 6,542,754 | B1 | 4/2003 | Sayers et al. |
| 7,643,595 | B2 | 1/2010 | Aweya et al. |
| 7,792,158 | B1 * | 9/2010 | Cho et al. ..................... 370/518 |
| 8,149,880 | B1 | 4/2012 | Cho et al. |
| 2001/0004366 | A1 | 6/2001 | Matsumura et al. |
| 2004/0022210 | A1 | 2/2004 | Frank et al. |

(Continued)

FOREIGN PATENT DOCUMENTS

| EP | 1427121 A1 | 6/2004 |
| WO | 2010/083930 A1 | 7/2010 |

(Continued)

OTHER PUBLICATIONS

H-P Loeb, et al.: "Implementing a Softawre-Based 802.11 MAC on a Customized Platform" CCNC 2009. 6t IEEE, Piscataway, NJ Jan. 2009.

IEEE Standard for information technology—Local and metropolitan area networks—Specific requirements—Part 11: Wireless LAN Medium Access Control (MAC) and Physical Layer (PHY) specifications Amendment 8: IEEE 802.11 Wireless Network Management.

IEEE Standard for Local and Metropolitan Area Networks—Timing and Synchronization for Time-Sensitive Applications in Bridged Local Area Networks.

(Continued)

*Primary Examiner* — Jamal Javaid

(74) *Attorney, Agent, or Firm* — Gazdzinski & Associates, PC

(57) ABSTRACT

A system for verifying clock synchronization between master and slave network equipment is provided. The master includes a transmitter, first control logic, and a first processor. The slave includes a receiver, second control logic, and a second processor. The transmitter may send synchronization packets to the receiver. When a synchronization packet is sent, the first control logic forwards a first timestamp sample to the first processor. In response to receiving a synchronization packet, the receiver may generate a second timestamp sample that is forwarded to the second processor. When a number of first timestamp samples are collected at the first processor, the transmitter may send a timestamp packet to the receiver. In response to receiving the timestamp packet, the receiver may compare the first and second timestamp samples in an effort to synchronize a slave reference clock in the slave to a master reference clock in the master.

20 Claims, 9 Drawing Sheets

(56) References Cited

U.S. PATENT DOCUMENTS

| | | |
|---|---|---|
| 2004/0240404 A1 | 12/2004 | Ibrahim et al. |
| 2005/0141565 A1 | 6/2005 | Forest et al. |
| 2008/0240021 A1 | 10/2008 | Guo et al. |
| 2008/0287153 A1 | 11/2008 | Fullam |
| 2009/0161655 A1 | 6/2009 | Uppala |
| 2011/0216816 A1 | 9/2011 | Frenzel |
| 2013/0343365 A1 | 12/2013 | Hollabaugh et al. |

FOREIGN PATENT DOCUMENTS

| | | | |
|---|---|---|---|
| WO | WO2010/083930 | * | 7/2010 |
| WO | 2012065823 | | 5/2012 |

OTHER PUBLICATIONS

International Preliminary Report on Patentability for Application No. PCT/US2013/040662, mailed on Nov. 11, 2014, 6 pages.

International Preliminary Report on Patentability for Application No. PCT/US2013/044837, mailed on Dec. 9, 2014, 7 pages.

International Search Report and Written Opinion for Application No. PCT/US2013/040662, mailed on Sep. 18, 2013, 8 pages.

International Search Report and Written Opinion for Application No. PCT/US2013/044837, mailed on Nov. 28, 2013, 10 pages.

Moustafa Youssef, at al. "PinPoint: An Asynchronous Time-Based Location Determination System", ACM 2 Penn Plaza, Jun. 2006.

* cited by examiner

METHODS AND APPARATUS FOR SYNCHRONIZING CLOCK SIGNALS IN A WIRELESS SYSTEM

PRIORITY

This application claims the benefit of priority to U.S. Provisional Patent Application No. 61/646,207 entitled "METHODS AND APPARATUS FOR SYNCHRONIZING CLOCK SIGNALS IN A WIRELESS TEST SYSTEM", filed May 11, 2012, which is incorporated herein by reference in its entirety.

BACKGROUND

This relates generally to wireless communications circuitry, and more particularly, to methods for testing wireless communications circuitry.

Electronic devices that contain wireless communications circuitry may be a computer such as a computer that is integrated into a display, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment. Electronic devices may use short-range wireless communications circuitry such as WiFi® (IEEE 802.11) circuitry and Bluetooth® circuitry. Electronic devices may also use long-range wireless communications circuitry such as cellular telephone circuitry and WiMax (IEEE 802.16) circuitry.

Consider a system in which a master network device is being used as an access point to service wireless communications among multiple slave network devices (i.e., among multiple end hosts). To establish an active connection with the master, each slave has to perform a clock synchronization operation with the master. If the clock synchronization operation is not properly performed between a master and a given slave, a master reference clock associated with the master and a slave reference clock associated with the given slave may have corresponding clock edges that are offset by an intolerable amount.

It would therefore be desirable to provide improved ways of performing master-slave clock synchronization and to provide ways for verifying whether or not the clock synchronization has been properly executed.

SUMMARY

In a first aspect of the present disclosure, a method for testing master and slave network equipment is disclosed. In one embodiment, the master network equipment comprises a transmitter and a master reference clock, the slave network equipment comprises a receiver and a slave reference clock, and the method comprises: receiving a synchronization packet comprising first control signals from the transmitter; generating and storing at least one master timestamp sample; in response to the receiving the synchronization packet from the transmitter, generating second control signals in slave control circuitry; generating and storing at least one slave timestamp sample based on the second control signals with the slave control circuitry; and comparing the at least one stored master timestamp sample to the at least one stored slave timestamp sample to determine whether the master and slave reference clocks are properly synchronized; wherein the first control signals comprise a transmit trigger signal and a transmit index of the transmitter; and the second control signals comprise a receive trigger signal and a receive index of the receiver.

In a second aspect of the present disclosure, a method for testing master and slave network equipment is disclosed. In one embodiment, the master network equipment comprises a transmitter and a master reference clock, the slave network equipment comprises a receiver and a slave reference clock, and the method comprises: receiving a synchronization packet comprising first control signals from the transmitter; generating and storing at least one master timestamp sample; in response to the receiving the synchronization packet from the transmitter, generating second control signals in slave control circuitry; generating and storing at least one slave timestamp sample based on the second control signals with the slave control circuitry; comparing the at least one stored master timestamp sample to the at least one stored slave timestamp sample to determine whether the master and slave reference clocks are properly synchronized; and intermittently receiving a timestamp packet comprising a predetermined number of accumulated ones of the at least master timestamp samples.

In a third aspect of the present disclosure, a method for testing master and slave network equipment is disclosed. In one embodiment, the master network equipment comprises a transmitter and a master reference clock, the slave network equipment comprises a receiver and a slave reference clock, and the method comprises: receiving a synchronization packet comprising first control signals from the transmitter; generating and storing at least one master timestamp sample; in response to the receiving the synchronization packet from the transmitter, generating second control signals in slave control circuitry; generating and storing at least one slave timestamp sample based on the second control signals with the slave control circuitry; and comparing the at least one stored master timestamp sample to the at least one stored slave timestamp sample to determine whether the master and slave reference clocks are properly synchronized; wherein: the at least one stored master timestamp sample comprises a master timestamp value and a master index value; the at least one stored slave timestamp sample includes a slave timestamp value and a slave index value, the slave index value corresponding to the master index value; and the comparing the at least one stored master timestamp sample to the at least one stored slave timestamp sample comprises computing a difference between the master timestamp value and the slave timestamp value.

In a fourth aspect of the present disclosure, a method for testing master and slave network equipment is disclosed. In one embodiment, the master network equipment comprises a transmitter and a master reference clock, the slave network equipment comprises a receiver and a slave reference clock, and the method comprises: receiving a synchronization packet comprising first control signals from the transmitter; generating and storing at least one master timestamp sample; in response to the receiving the synchronization packet from the transmitter, generating second control signals in slave control circuitry; generating and storing at least one slave timestamp sample based on the second control signals with the slave control circuitry; comparing the at least one stored master timestamp sample to the at least one stored slave timestamp sample to determine whether the master and slave reference clocks are properly synchronized; generating and storing additional slave timestamp samples; and in response to the receiving the synchronization packet, comparing the at least one stored master timestamp samples in the received synchronization packet to the stored additional slave timestamp samples to determine whether the receiver has failed to receive any synchronization packets from the transmitter.

In a fifth aspect of the present disclosure, a method for operating master and slave network equipment is disclosed. In one embodiment, the master network equipment comprises a transmitter, the slave network equipment comprises a receiver, and the method comprises: receiving a timestamp packet from the receiver with a second control logic in the slave network equipment, the slave network equipment comprising a slave reference clock; in response to receiving a synchronization packet at the receiver, generating and storing slave timestamp samples with the second control logic; in response to the receiving the timestamp packet from the receiver, comparing the stored slave timestamp samples with at least one master timestamp sample in the received timestamp packet to determine whether a master reference clock and the slave reference clock are properly synchronized; and receiving synchronization control signals from the transmitter with a first control logic; wherein the synchronization control signals include a trigger signal and an index signal.

Further features of the present invention, its nature and various advantages will be more apparent from the accompanying drawings and the following detailed description.

DETAILED DESCRIPTION

Figure 1:
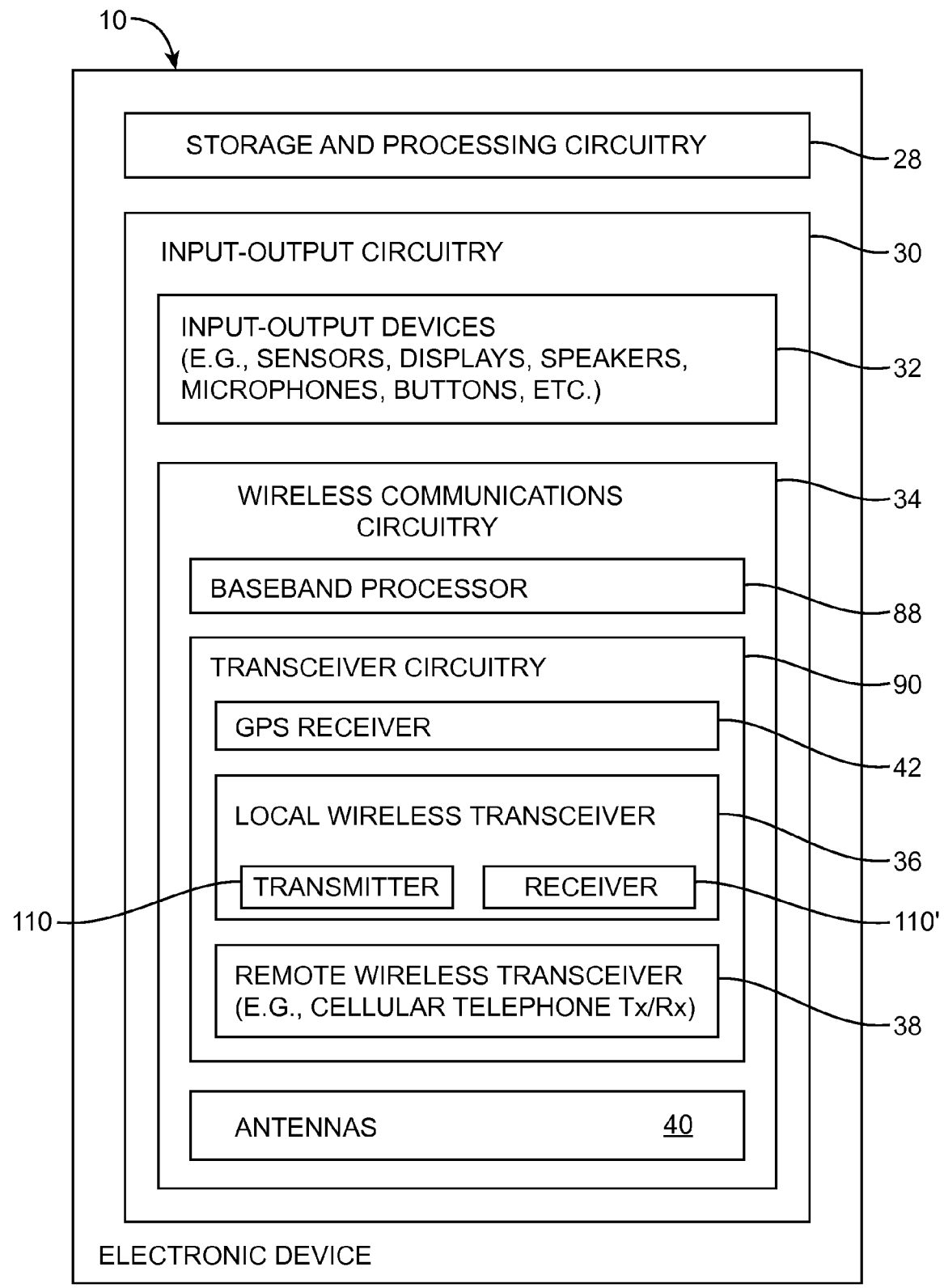
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support short-range wireless communications. For example, device 10 may include wireless circuitry for handling local area network links such as WiFi® links at 2.4 GHz and 5 GHz, Bluetooth® links at 2.4 GHz, etc. The wireless communications circuitry may also be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment such as base station 21, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, IEEE 802.16 (WiMax) protocols, cellular telephone protocols such as the "2G" Global System for Mobile Communications (GSM) protocol, the "2G" Code Division Multiple Access (CDMA) protocol, the "3G" Universal Mobile Telecommunications System (UMTS) protocol, and the "4G" Long Term Evolution (LTE) protocol, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 90 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data traffic.

Transceiver circuitry 90 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

As shown in FIG. 1, wireless communications circuitry 34 may also include baseband processor 88. Baseband processor may include memory and processing circuits and may also be considered to form part of storage and processing circuitry 28 of device 10.

Baseband processor 88 may be used to provide data to storage and processing circuitry 28. Data that is conveyed to circuitry 28 from baseband processor 88 may include raw and processed data associated with wireless (antenna) performance metrics for received signals such as received power, transmitted power, frame error rate, bit error rate, channel quality measurements based on received signal strength indicator (RSSI) information, channel quality measurements based on received signal code power (RSCP) information, channel quality measurements based on reference symbol received power (RSRP) information, channel quality measurements based on signal-to-interference ratio (SINR) and signal-to-noise ratio (SNR) information, channel quality measurements based on signal quality data such as Ec/Io or Ec/No data, information on whether responses (acknowledgements) are being received from a cellular telephone tower corresponding to requests from the electronic device, information on whether a network access procedure has succeeded, information on how many re-transmissions are being requested over a cellular link between the electronic device and a cellular tower, information on whether a loss of signaling message has been received, information on whether paging signals have been successfully received, and other information that is reflective of the performance of wireless circuitry 34. This information may be analyzed by storage and processing circuitry 28 and/or processor 88 and, in response, storage and processing circuitry 28 (or, if desired, baseband processor 58) may issue control commands for controlling wireless circuitry 34. For example, baseband processor 88 may issue commands that direct transceiver circuitry 90 to switch into use desired transmitters/receivers and antennas.

Antenna diversity schemes may be implemented in which multiple redundant antennas are used in handling communications for a particular band or bands of interest. In an antenna diversity scheme, storage and processing circuitry 28 may select which antenna to use in real time based on signal strength measurements or other data. In multiple-input-multiple-output (MIMO) schemes, multiple antennas may be used in transmitting and receiving multiple data streams, thereby enhancing data throughput.

As shown in FIG. 1, local wireless transceiver circuitry 36 may include a transmitter 110 for wirelessly transmitting short-range radio-frequency signals to a local area network device and a receiver 110 for wirelessly receiving short-range radio-frequency signals from another local area network device. Consider a scenario in which a slave network device is attempting to establish an active wireless connection with a master network device. The master network device may sometimes be referred to as a wireless access point (sometimes referred to as master network equipment), whereas the slave network device may sometimes be referred to as an end host or an end client (sometimes referred to as slave network equipment).

The slave network device may initially be placed in a low power standby mode. In order for the slave network device to establish an active data connection with the master network device, a series of master-slave handshake operations may be performed. In particular, synchronization (or "sync") packets may be transmitted in a dedicated synchronization channel from the master network device (e.g., using transmitter 110) to the slave network device to ensure that a reference clock associated with the slave is sufficiently synchronized with a reference clock associated with the master. The slave network device may receive the sync packets from the master using receiver 110' (as an example).

The slave reference clock may be considered to be "synchronized" with the master reference clock when the frequency offset, phase offset, and index offset between the two reference clocks are within satisfactory limits. The frequency offset refers to any mismatch in frequency between the master and slave reference clocks. The phase offset may refer to the amount by which adjacent master-slave clock edges are misaligned. Each clock edge may correspond to an associated index value. The index offset may refer to any mismatch between master and slave rising clock edges that have the same index value.

For example, it may be desirable to ensure that the master and reference clocks each having a clock rate of 50 kHz is synchronized to within 10 μs (e.g., to ensure that the frequency, phase, and index offset amounts to less than a half clock cycle). Applications in which such degree of synchronization accuracy is required may include a system having wirelessly connected speakers, where each of the wirelessly linked speakers have to be synchronized with a master access point to ensure that the acoustic wavefronts produced by the respective speakers are sufficiently aligned.

Figure 2:
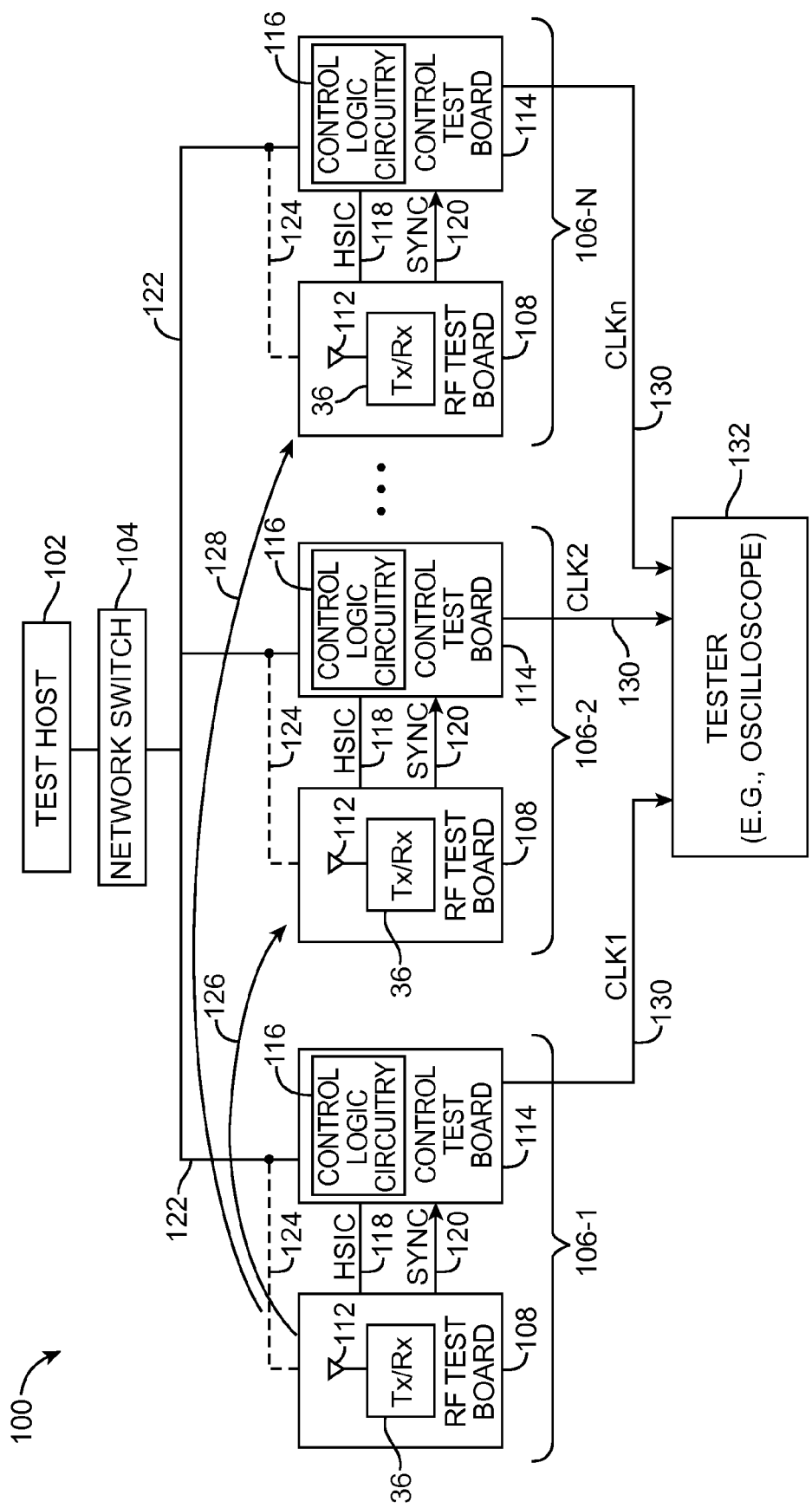
FIG. 2 is a diagram of an illustrative test system that includes multiple test stations in accordance with an embodiment of the present invention.

FIG. 2 shows a test system 100 that can be used to test the accuracy of this clock synchronization process among multiple network devices. As shown in FIG. 2, test system 100 may include a test host such as test host 102, a network switch such as switch 104, a tester such as tester 132, and multiple test stations 106 (e.g., first test station 106-1, second test station 106-2, ..., n-th test station 106-n). Each test station 106 may, for example, include a transceiver chip 36 that is mounted on a radio-frequency (RF) test board 108 and control logic circuitry 116 that is mounted on control test board 114. Signals may be conveyed between test board 108 and test board 114 via path 118 and 120. In particular, transceiver 36 may output synchronization signals to control logic circuitry 116 via path 120, whereas data packets may be conveyed between transceiver 36 and control logic circuitry 116 via path 118. Path 118 may, for example, be a High-Speed Inter-Chip (HSIC) based connection. If desired, path 118 may be implemented using Secure Digital Input-Output (SDIO) based connection, a Peripheral Component Interconnect Express (PCIe) based connection, or other suitable high-speed interfaces. Path 120 may, as an example, be connected to general purpose input-output (GPIO) pins associated with transceiver 36 (e.g., transceiver 36 may be configured to output synchronization related control signals onto appropriate GPIO pins).

The operation of each test station 106 may be coordinated using test host 102. In particular, test host 102 may be connected to the control logic circuitry in each test station via network switch 104 and path 122. Data and control signals may be conveyed between the control logic circuitry in each test station and test host 102 via path 122. Network switch 104 may be a gigabit Ethernet switching circuit, and path 122 may be formed using Ethernet cables such as Category 5 or Category 5e (enhanced) cables (as an example). In general, test host 102 may include one or more networked computers and may be used to maintain a database of test results, may be used in sending test commands to test stations 106, may send user data signals to test stations 106, may receive user data signals from test stations 106, and may perform other control operations. In another suitable arrangement, test host 102 may instead be connected to transceiver 36 via dotted path 124.

Test host 102 may configure a selected one of test stations 106 to serve as an access point to which other test stations in system 100 may be synchronized. For example, first test station 106-1 may be selected to act as the access point while remaining test stations 106-2 to 106-n act as end hosts (e.g., test station 106-1 may be selected as the master while other test stations are configured as slaves). Test system 100 may support both unicast and multicast synchronization configurations. In the unicast configuration, the access point may synchronize with each end host one at a time. In the multicast synchronization configuration, the access point may synchronize with multiple end hosts in parallel (as shown by wireless paths 126 and 128).

Control logic circuitry 116 in each test station 106 may be used to generate a corresponding output clock signal. In the example of FIG. 2, first test station 106-1 may produce a first output clock signal Clk1, second test station 106-2 may produce a second output clock signal Clk2, ..., and n-th test station 106-n may produce an n-th output clock signal Clkn. These output clock signals may be fed to tester 132 (e.g., an oscilloscope) via path 130 for analysis. If the synchronization operation is successfully performed, the output clock signals associated with the slave end hosts as measured by tester 32 should be sufficiently synchronized relative to the output clock signal associated with the master access point.

The arrangement of FIG. 2 is merely illustrative and does not serve to limit the scope of the present invention. If desired, test system 100 may include any number of test stations each of which can include control logic circuitry configured to control timing parameters associated with remote wireless transceiver 38, with GPS receiver 42, and other wireless circuits.

Figure 3:
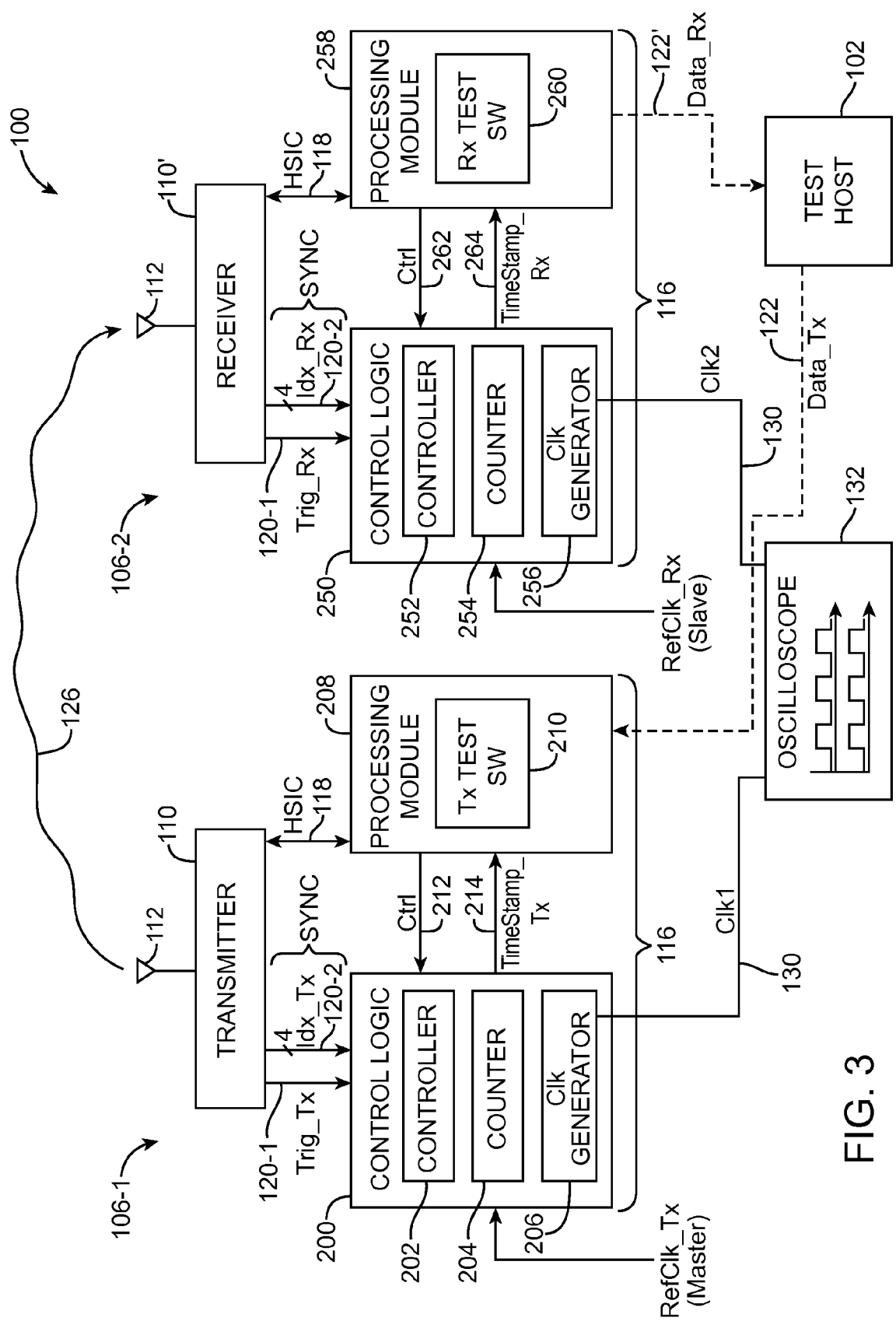
FIG. 3 is a diagram showing a test system having a master test station (e.g., a transmitting test station) and a slave test station (e.g., a receiving test station), where each test station includes a transmitter/receiver, control logic, and a processing module in accordance with an embodiment of the present invention.

FIG. 3 shows one suitable arrangement for test system 100. As described in connection with FIG. 1, transceiver 36 may include transmitter 110 and receiver 110'. In the example of FIG. 3, first test station 106-1 may serve as a master network device (e.g., as an access point), whereas second test station 106-2 may serve as a slave network device (e.g., as an end host that needs to synchronize with the master). Control logic circuitry 116 of the master may be configured to include control logic 200 and processing module 208, whereas control logic circuitry 116 of the slave may be configured to include control logic 250 and processing module 258. Control logic circuitry 116 of the master may therefore sometimes be referred to as master control and processing circuitry, whereas control logic circuitry 116 of the slave may sometimes be referred to as slave control and processing circuit.

Data signals and synchronization signals may be transmitted from antenna 112 associated with transmitter 110 in the master to antenna 112 associated with receiver 110' in the slave (as shown via wireless path 126). In other words, the master device is generally associated with the transmission (Tx) of critical timing signals while the slave device is general associated with the reception (Rx) of the critical timing signals during synchronization operations. Master test station 106-1 also includes receiver 110' but is omitted from FIG. 3 for simplicity. Similarly, slave test station 106-2 also includes transmitter 110 but is omitted from FIG. 3 for clarity.

Control logic circuitry 200 may receive synchronization control signals from transmitter 110. In particular, control logic 200 may receive a transmit trigger signal Trig_Tx via path 120-1 and may receive a transmit index signal Idx_Tx via path 120-2. During synchronization, transmitter 110 may transmit synchronization (sync) packets, timestamp packets, and normal data packets to receiver 110'. Transmitter 110 may be configured to pulse signal Trig_Tx high whenever transmitter 110 transmits a synchronization packet to receiver 110'. Signal Idx_Tx may be a four-bit digital signal and may be used to uniquely identify up to 16 synchronization packets (as an example). If desired, signal Idx_Tx may include less than four bits or more than four bits.

Control logic 200 may include a controller 202, counter 204, and clock generator 206. Control logic 200 may receive a master reference clock signal RefClk_Tx that is used to drive free running counter 204 (e.g., a counter that periodically increments at each and every rising edge of master reference signal RefClk_Tx). Clock generator 206 may be used to output clock signal Clk1 that is derived from RefClk_Tx. As an example, clock generator 206 may be a frequency divider that produces signal Clk1 that is a frequency divided version of signal RefClk_Tx (e.g., RefClk_Tx may have a clock rate that is an integer multiple of the clock rate of Clk1).

Controller 202 may be used to implement a state machine that directs the operation of control logic 200. As an example, when control logic 200 detects an asserted Trig_Tx, controller 202 may capture a timestamp value (or sample) TimeStamp_Tx and may then forward the timestamp sample to processing circuitry 208 via path 214. Control logic 200 may be configured using configuration data and other control signals that are sent from processor 208 via path 212. Paths 212 and 214 linking control logic 200 and processor 208 may be a Universal Asynchronous Receiver/Transmitter (UART) based connection, a Universal Serial Bus (USB) based connection, a Generic Serial Peripheral Interface (gSPI) based connection, or may be formed using other suitable interface standards.

Processor 208 may be used to run transmit (Tx) test software 210 (e.g., software running autonomously on processor 208) that processes timing information received from control logic 200, places control logic 200 in desired states, generates timestamp packets, forwards timestamp packets and normal user data to transmitter 110 via HSIC path 118, and directs other test operations. As shown in FIG. 3, normal user data Data_Tx may be provided from test host 102 to processor 208 via path 122.

As with control logic circuitry 200, control logic circuitry 250 associated with the slave may receive synchronization control signals from receiver 110'. In particular, control logic 250 may receive a receive trigger signal Trig_Rx via path 120-1 and may receive a receive index signal Idx_Rx via path 120-2. During synchronization, receiver 110' may receive synchronization packets, timestamp packets, and normal data packets from transmitter 110. Receiver 110' may be configured to pulse signal Trig_Rx high whenever receiver 110' receives a sync packet from transmitter 110. Signal Idx_Rx may be extracted from the received sync packet and presented on path 120-2. Signal Idx_Rx may have at least the same bit-width as Idx_Tx and may be used to uniquely identify up to a certain number of sync packets depending on the bit-width of Idx_Rx.

Control logic 250 may include a controller 252, counter 254, and clock generator 256. Control logic 250 may receive a slave reference clock signal RefClk_Rx that is used to drive free running counter 254 (e.g., a counter that increments at each and every rising edge of signal RefClk_Rx). Clock generator 256 may be used to output clock signal Clk2 that is derived from RefClk_Rx. As an example, clock generator 256 may be a frequency divider operable to produce signal Clk2 that is a frequency divided version of signal RefClk_Rx (e.g., RefClk_Rx may have a clock rate that is an integer multiple of the clock rate of Clk2). In general, master reference clock RefClk_Tx and slave reference clock RefClk_Rx should exhibit closely matched frequencies, and the amount of frequency division provided using generator 206 and 256 should be the same.

Controller 252 may be used to implement a state machine that controls the operation of logic 250. As an example, when control logic 250 detects an asserted Trig_Rx, controller 252 may capture a timestamp sample TimeStamp_Rx and may then forward the timestamp sample to processor circuitry 258 via path 264. Control logic 250 may be configured using configuration data and other control signals that are sent from processor 258 via path 262. Paths 262 and 264 that link control logic 200 and processor 258 may be a Universal Asynchronous Receiver/Transmitter (UART) based connection, a Universal Serial Bus (USB) based connection, a Generic Serial Peripheral Interface (gSPI) based connection, or may be formed using other suitable interface standards.

In contrast to Tx processor 208, Rx processor 258 may be used to run Rx test software 260 that is used to process timing information received from control logic 250, to place control logic 250 in desired states, to receive timestamp packets and normal user data from receiver 110' via HSIC path 118, to determine the amount of timing mismatch between signals RefClk_Tx and RefClk_Rx based on the received timestamp data, and to direct other test operations. As shown in FIG. 3, normal user data Data_Rx may be provided from processor 258 to test host 102 via path 122'.

Rx test software 260 may adjust the frequency of RefClk_Rx so that slave RefClk_Rx is sufficiently synchronized with respect to master RefClk_Tx. In order for RefClk_Rx to be considered as being properly synchronized, RefClk_Tx and RefClk_Rx should be matched in terms on frequency, phase, and index. If either the frequency offset, phase offset, or index offset is greater than pre-specified frequency, phase, and index deviation thresholds, RefClk_Rx should not be considered as being properly synchronized.

Figure 4:
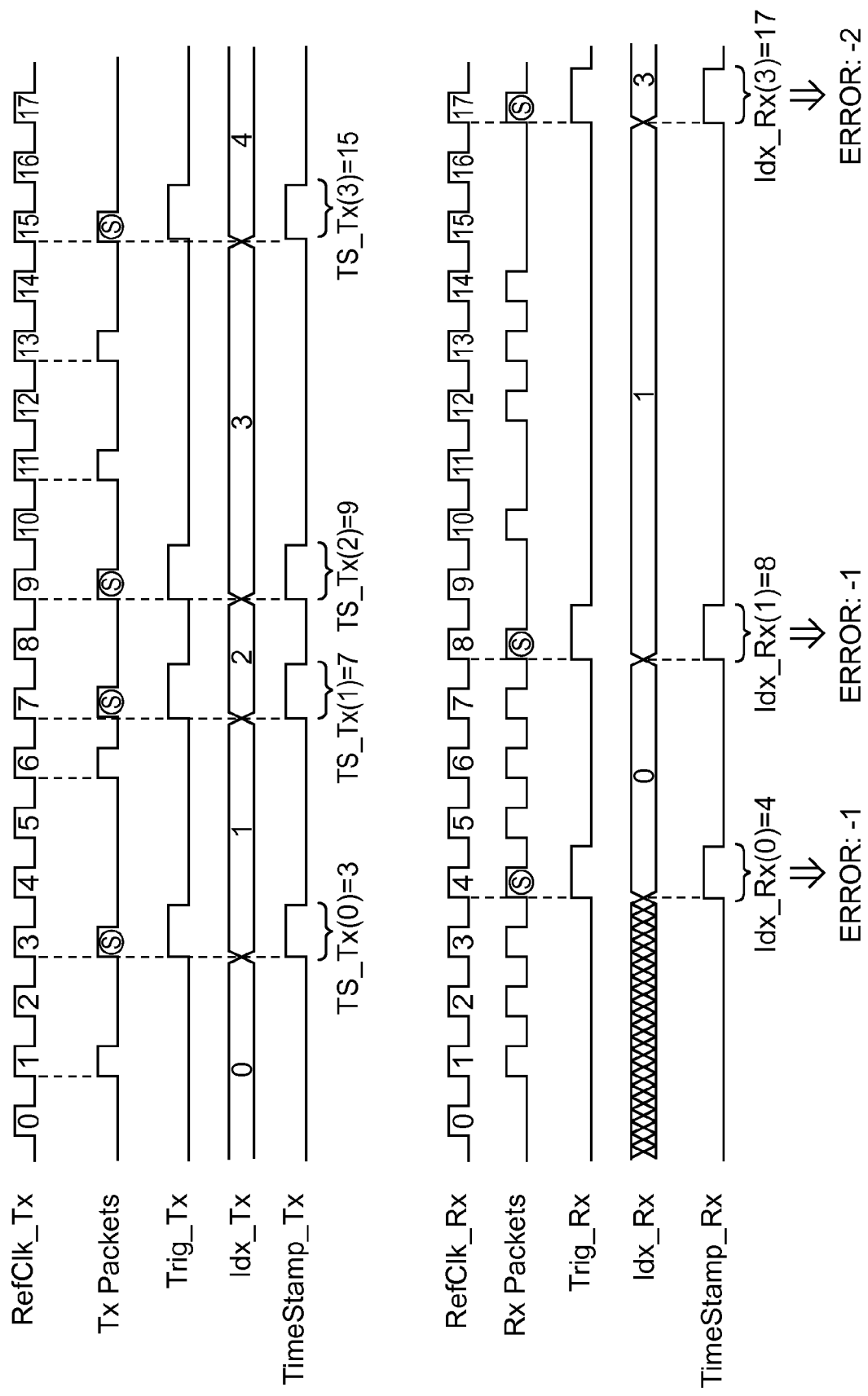
FIG. 4 is a timing diagram illustrating the operation of master and slave test stations of the type shown in FIG. 3 in accordance with an embodiment of the present invention.

FIG. 4 is a timing diagram illustrating the operation of test system 100. As described in connection with FIG. 3, signal RefClk_Tx may be used to drive a free running counter 204. Counter 204 may be used to keep a running tally of the number of elapsed RefClk_Tx cycles for master test station 106-1. As shown in FIG. 4, transmitter 110 may transmit normal user data at the $1^{st}$, $6^{th}$, $11^{th}$, and $13^{th}$ clock cycles and may transmit sync packets at the $3^{rd}$, $7^{th}$, $9^{th}$, and $15^{th}$ clock cycle.

Every time a sync packet is sent, transmitter 110 will temporarily assert Trig_Tx and increment Idx_Tx. Idx_Tx may or may not be initialized to zero. When control logic 200 detects an asserted Trig_Tx (e.g., when control logic 200 detects a rising edge on path 120-1), control logic 200 may forward a current timestamp data point TimeStamp_Tx that is based on the current value of counter 204 to processing module 208 via path 214 (see, FIG. 3). Each timestamp data point (or sample) may include an index value that is associated with the current Idx_Tx value (prior to being incremented) and an absolute timestamp value as provided by counter 204.

In the example of FIG. 4, a first timestamp sample with an index of 0 and a timestamp value of 3 (i.e., TS_Tx(0) is equal to 3) may be generated in response to transmitting the first sync packet at the $3^{rd}$ clock edge, a second timestamp sample with an index of 1 and a timestamp value of 7 (i.e., TS_Tx(1) is equal to 7) may be generated in response to transmitting the second sync packet at the $7^{th}$ clock edge, a third timestamp sample with an index of 2 and a timestamp value of 9 (i.e., TS_Tx(2) is equal to 9) may be generated in response to transmitting the third sync packet at the $9^{th}$ clock edge, and a fourth timestamp sample with an index of 3 and a timestamp value of 15 (i.e., TS_Tx(3) is equal to 15) may be generated in response to transmitting the fourth sync packet at the $15^{th}$ clock edge. Timestamp samples generated by control logic 200 in this way may be received by and stored (accumulated) in processor 208.

Signal RefClk_Rx may be used to drive a free running counter 254. Counter 254 may be used to keep a running tally of the number of elapsed clock cycles for slave test station 106-2. As shown in FIG. 4, receiver 110' may receive sync packets at the $4^{th}$, $8^{th}$, and $17^{th}$ clock cycle and may receive normal user data from test station 106-1 or other test station during other clock cycles. Every time a sync packet is received, receiver 110' will temporarily assert Trig_Rx and extract an Idx_Rx value from the received sync packet. When control logic 250 detects an assert Trig_Rx (e.g., when control logic 250 detects a rising edge on path 120-1), control logic 200 may forward a current timestamp sample TimeStamp_Rx that is based on the current value of counter 254 to processing module 258 via path 264 (see, FIG. 3). Each timestamp may include the extracted index value and an absolute timestamp value as provided by counter 254.

In the example of FIG. 4, a first timestamp sample with an index of 0 and a timestamp value of 4 (i.e., TS_Rx(0) is equal to 4) may be generated in response to receiving the first sync packet at the $4^{th}$ clock edge, a second timestamp sample with an index of 1 and a timestamp value of 8 (i.e., TS_Rx(1) is equal to 8) may be generated in response to receiving the second sync packet at the $8^{th}$ clock edge, and a third timestamp sample with an index of 3 and a timestamp value of 17

(i.e., TS_Rx(3) is equal to 17) may be generated in response to receiving the third sync packet at the 17$^{th}$ clock edge. Timestamp samples generated by control logic 250 in this way may be received by and stored (accumulated) in processor 258. In this example, processor 258 may detect that a sync packet was dropped because a timestamp sample with an index value of 2 is missing. Processor 258 may therefore be used to detect missing sync packets by monitoring the index values in each received timestamp sample.

Test software 260 running on processor 258 may be used to compare timestamp information received from transmitter 110 with timestamp information received from Rx control logic 250. For example, software 260 may compare timestamp samples with matching indices to determine whether RefClk_Rx is clocking ahead of or behind RefClk_Tx. By comparing TS_Tx(0) with TS_Rx(0), processor 258 may obtain an index error of −1 (i.e., RefClk_Tx is trailing RefClk_Rx by one clock cycle). By comparing TS_Tx(3) with TS_Rx(3), processor 258 may obtain an index error of −2 (i.e., RefClk_Tx is trailing RefClk_Rx by two clock cycles). Note that it is possible to be frequency matched (assuming RefClk_Tx and RefClk_Rx are clocking at the same clock rate) and phase matched (assuming RefClk_Tx and RefClk_Rx have aligned clock edges) but not index matched (i.e., the index error is not equal to zero).

In scenarios in which timestamp comparisons show that master RefClk_Tx trails RefClk_Rx (as is shown in FIG. 4), processor 258 may be used to temporarily lower the frequency of RefClk_Rx until the index error is eliminated. Doing so may temporarily result in mismatched clock rates, but the frequency of RefClk_Rx will be readjusted to match RefClk_Tx once the index error is equal to zero. In scenarios in which timestamp comparisons indicate that master RefClk_Tx is clocking ahead of RefClk_Rx, processor 258 may be used to temporarily increase the frequency of RefClk_Rx until the index error is eliminated. When the index error is zero, RefClk_Tx and RefClk_Rx are said to be synchronized (e.g., the master and slave clock signals are matched in terms of frequency, phase, and index).

Figure 5:
FIG. 5 is a diagram of an illustrative wireless synchronization packet in accordance with an embodiment of the present invention.

FIG. 5 is a diagram of a sync packet 296 that may be transmitted wireless from transmitter 110 to receiver 110'. As shown in FIG. 5, sync packet 296 may contain source/destination address information, a sync packet identifier that indicates to receiver 110' that this is a sync packet, the current Idx_Tx value (prior to incrementing), and error detection bits such as cyclic redundancy check (CRC) bits. Upon receiving packet 296 from transmitter 110, receiver 110' may extract bits Idx_Tx from packet 296 and present the extracted bits onto path 120-2 to Rx control logic 250.

Figure 6:
FIG. 6 is a diagram of an illustrative wireless timestamp packet in accordance with an embodiment of the present invention.

FIG. 6 is a diagram of a timestamp packet 298 that may be transmitted wirelessly from transmitter 110 to receiver 110'. As shown in FIG. 6, timestamp packet 298 may contain source/destination address information, a timestamp packet identifier that indicates to receiver 110' that this is a timestamp packet, timestamp data such as a set of timestamp samples that have been accumulated using processor 208, and error detection bits such as cyclic redundancy check (CRC) bits. The number of timestamp samples contained in each timestamp packet may depend on the bit width of Idx_Tx. For example, if Idx_Tx is a 5-bit binary signal, timestamp packet 298 may include 32 (i.e., $2^5$) timestamp samples. Upon receiving packet 298 from transmitter 110, receiver 110' may forward the timestamp data to processor 258 via path 118 for later processing.

The formats of packets 296 and 298 as shown in FIGS. 5 and 6 are merely illustrative and do not serve to limit the scope of the present invention. If desired, packets 296 and 298 may include additional header information, additional trailer information, and/or other suitable control information.

Figure 7:
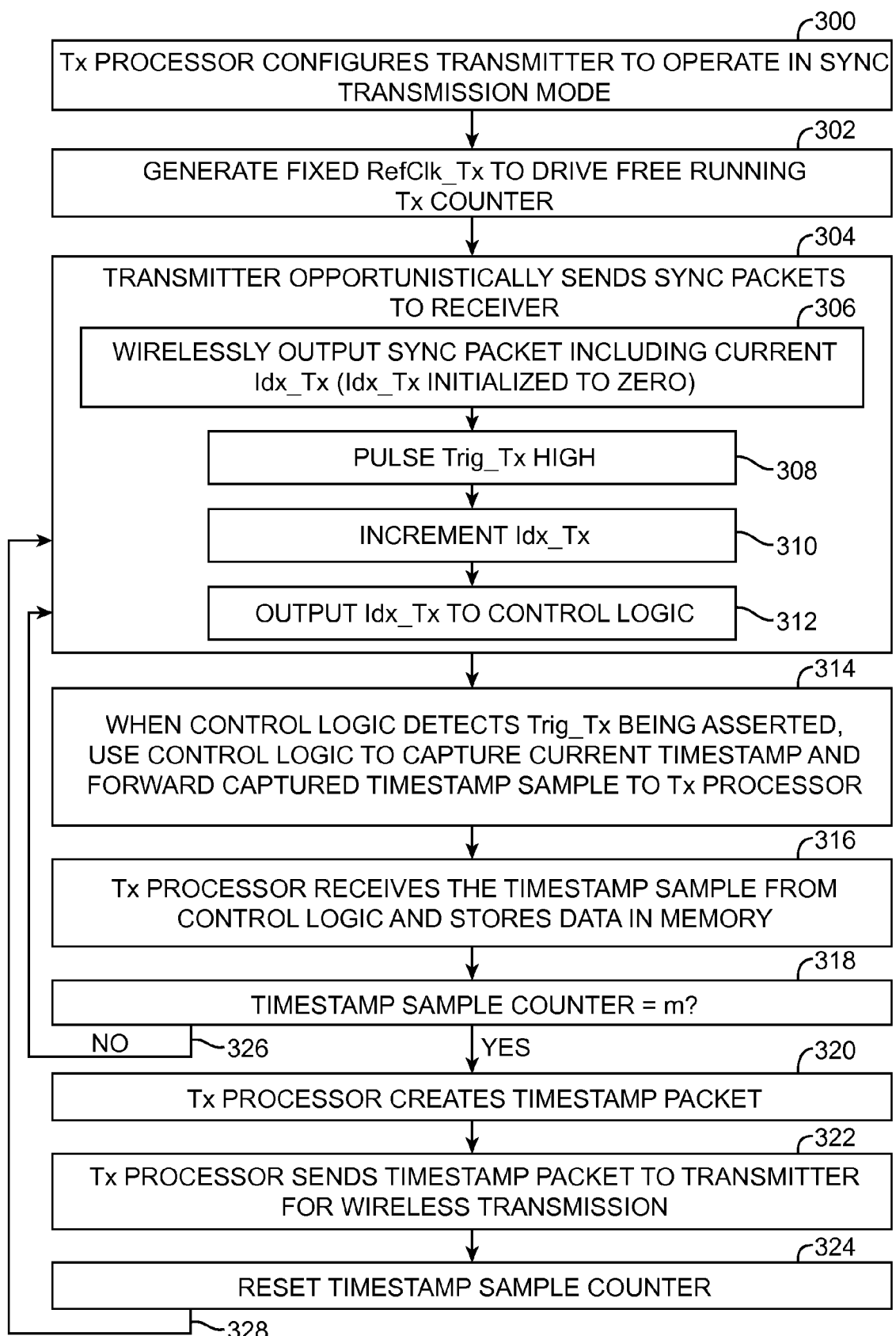
FIG. 7 is a flow chart showing illustrative steps involved in operating the master test station of FIG. 3 in accordance with an embodiment of the present invention.

FIG. 7 is a flow chart of illustrative steps involved in operating a master (Tx) test station such as test station 106-1 of FIG. 3. At step 300, Tx processor 208 may configure transmitter 110 to operate in a sync transmission mode (e.g., by sending appropriate commands to transmitter 110 via path 118). At step 302, a crystal oscillator on RF test board 108 (FIG. 2) associated with test station 106-1 may be used to generate a stable (fixed) RefClk_Tx that drives free running Tx counter 204.

When placed in the sync transmission mode, transmitter 110 may opportunistically send sync packets to receiver 110' (step 304). For example, transmitter 110 may wait for a random amount of time before sending each successive sync packet. In particular, transmitter 110 may wirelessly transmit a sync packet 296 of the type described in connection with FIG. 5 (step 306), may temporarily pulse Trig_Tx high (step 308), may increment Idx_Tx (step 310), and may present the incremented Idx_Tx to control logic 200 (step 312).

When Tx control logic 200 detects an asserted Trig_Tx, control logic 200 may capture a current timestamp sample based on a previously received Idx_Tx and the current output of counter 204 and may then forward the captured timestamp sample to Tx processor 208 (step 314).

At step 316, Tx processor 208 may receive the timestamp sample from control logic 200 and may store the received timestamp sample in memory. At step 318, software 210 may determine whether a sufficient number of timestamp samples have been accumulated at processor 208 (e.g., whether a timestamp sample counter output reflective of the number of accumulated timestamp samples is equal to predetermined amount m). Predetermined amount m may be dependent on the bit width of Idx_Tx. For example, if Idx_Tx is a four bit signal, m may be equal to 16 (i.e., $2^4$). As another example, if Idx_Tx is a six bit signal, m may be equal to 64 (i.e., $2^6$).

If the timestamp sample counter output is less predetermined threshold m, processing may loop back to step 304 in preparation of transmitting a subsequent sync packet after a random amount of wait time has elapsed (as indicated by path 326).

If the timestamp sample counter output is equal to predetermined threshold m, test software 210 may proceed to step 320 to generate a timestamp packet that includes each timestamp sample accumulated in processor 208 during step 316 since a previous timestamp packet transmission (e.g., timestamp packet may include m timestamp samples).

At step 322, Tx processor 208 may forward the timestamp packet to transmitter 110 for wireless transmission (e.g., the timestamp packet generated at step 320 is transmitted from transmitter 110 to receiver 110' via wireless path 126). At step 324, the timestamp sample counter may be reset to zero and processing may loop back to step 304 in preparation of transmitting a subsequent sync packet after a random amount of wait time (as indicated by path 328).

Figure 8:
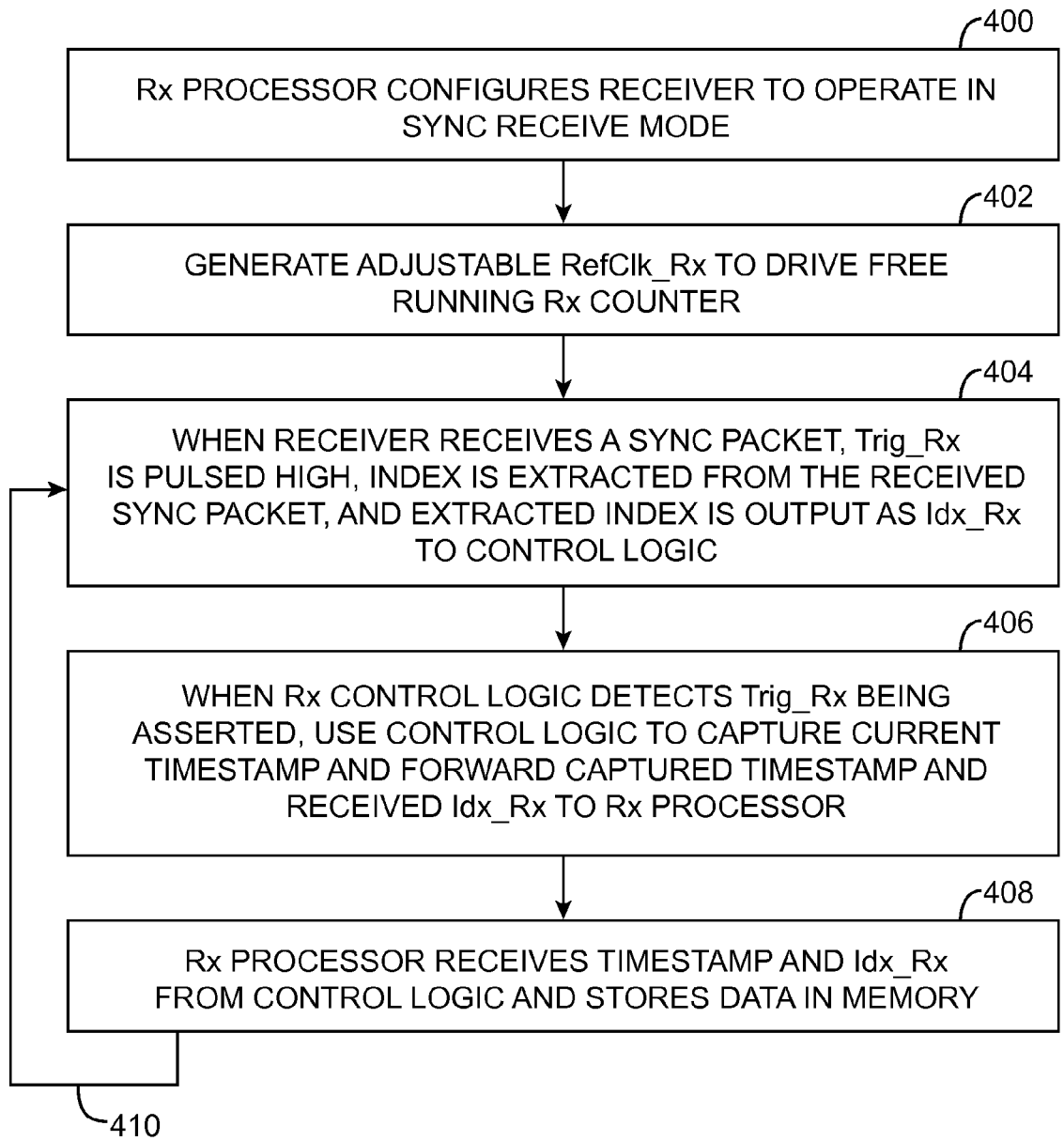
FIGS. 8 and 9 are flow charts showing illustrative steps involved in operating the slave test station of FIG. 3 in accordance with an embodiment of the present invention.
Figure 9:
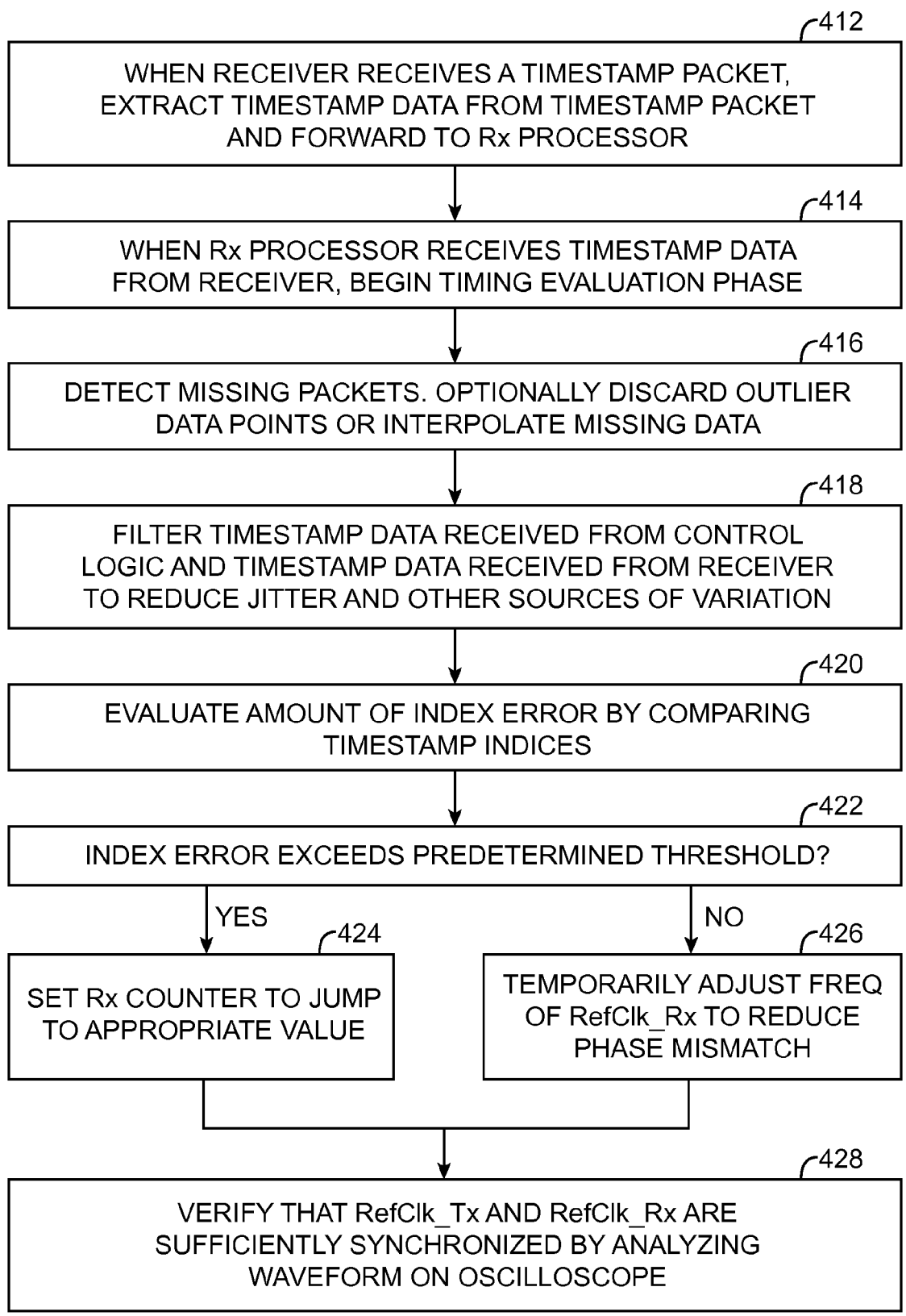

FIGS. 8 and 9 are flow charts of illustrative steps involved in operating a slave (Rx) test station such as test station 106-2 of FIG. 3. At step 400, Rx processor 258 may configure receiver 110' to operate in a sync receive mode (e.g., by sending appropriate commands to receiver 110' via path 118). At step 402, a digitally controlled oscillator (DCO) on RF test board 108 associated with test station 106-2 may be used to generate an adjustable RefClk_Rx that drives free running Rx counter 254 (as an example). If desired, a stable reference clock source such as a crystal oscillator may be used to generate RefClk_Rx, and a separate adjustable clock source from which Clk2 is derived may be tuned during a clock timing evaluation phase.

When placed in the sync receive mode, receiver 110' may continuously monitor a dedicated sync channel in anticipation of a sync packet broadcast from transmitter 110. In response to receiving a sync packet, receiver 110' may temporarily pulse Trig_Rx high, extract an index value from the received sync packet (see, FIG. 5), and output the extracted index value as Idx_Rx to Rx control logic 250 (step 404).

When Rx control logic 250 detects an asserted Trig_Rx, control logic 250 may capture a current timestamp sample based on the currently received Idx_Rx and the current output of counter 254 and may then be used to forward the captured timestamp sample to Rx processor 258 (step 406).

At step 408, Rx processor 258 may receive the timestamp sample from control logic 250 and may store the received timestamp sample in memory. Processing may then loop back to step 404 in preparation of receiving a subsequent sync packet from transmitter 110 (as indicated by path 410).

When receiver 110' receives a timestamp packet from transmitter 110, receiver 110' may extract the timestamp data from the timestamp packet and may forward the extracted timestamp data to Rx processor 258 via path 118 (see, FIG. 9, step 412). The extracted timestamp data may include m timestamp samples that were previously accumulated in Tx processor 208. The timestamp samples that Rx processor 258 receives from receiver 110' via path 118 may sometimes be referred to as master timestamp samples, whereas the timestamp samples that Rx processor 258 receives from Rx control logic 250 via path 264 may sometimes be referred to as slave timestamp samples.

When Rx processor 258 receives the master timestamp samples from receiver 110' (step 414), test software 260 may be used to perform clock timing evaluation (e.g., to determine an amount of mismatch present between master clock RefClk_Tx and slave clock RefClk_Rx, if any).

At step 416, software 260 may compare the master timestamp samples with the slave timestamp samples to determine whether any timestamp samples have been dropped. As an example, missing timestamp samples may be detected by examining each pair of adjacent timestamp samples to ensure that the associated indices are consecutively increasing integers. If a pair of adjacent timestamp samples exhibits non-consecutive indices (jumping from an index of 1 to an index of 3 as described in the example of FIG. 4), a missing timestamp is detected, which is also indicative of a dropped sync packet. Test software 260 may optionally discard any sampled data associated with dropped packets or may interpolate missing data based on existing data points.

At step 418, test software 260 may apply digital filtering on the master timestamp samples and the slave timestamp samples (e.g., using a finite impulse response filter or an infinite impulse response filter) to remove jitter and other sources of nonsystematic variation.

At step 420, test software 260 may evaluate the amount of index error present between RefClk_Tx and RefClk_Rx by comparing the master timestamp indices with the slave timestamp indices (e.g., by comparing the absolute timestamp count values for corresponding pairs of master-slave timestamp samples with the same index, as described in connection with the example in FIG. 4).

If the amount of index error exceeds a predetermined threshold, processor 258 may configure counter 254 to jump to a desired count value by sending appropriate commands over path 262 (step 424). Directing counter 254 to jump to the desired count value may effectively remove any index error. If the amount of index error is less than the predetermined threshold, test software 260 may temporarily adjust the frequency of RefClk_Rx to reduce any remaining index/phase mismatch between RefClk_Tx and RefClk_Rx (step 426). As an example, if RefClk_Rx is delayed with respect to RefClk_Tx, the frequency of RefClk_Rx may be slightly increased to help "catch up" to the RefClk_Tx. As another example, if RefClk_Rx is clocking ahead of RefClk_Tx, the frequency of RefClk_Rx may be slightly decreased to allow RefClk_Tx to catch up to RefClk_Rx.

At step 428, a test operator or automated test equipment may verify that RefClk_Tx and RefClk_Rx are synchronized according to design criteria by analyzing the waveform of Clk1 and Clk2 (derived from RefClk_Tx and RefClk_Rx, respectively) on oscilloscope 132.

The steps as shown in FIGS. 7-9 are merely illustrative and do not serve to limit the scope of the present invention. If desired, transmitter 110 may be configured to periodically send sync packets, synchronization of multiple end hosts to a single access point may be simultaneously tested (i.e., test system 100 may support multicast testing), etc.

Figure 10:
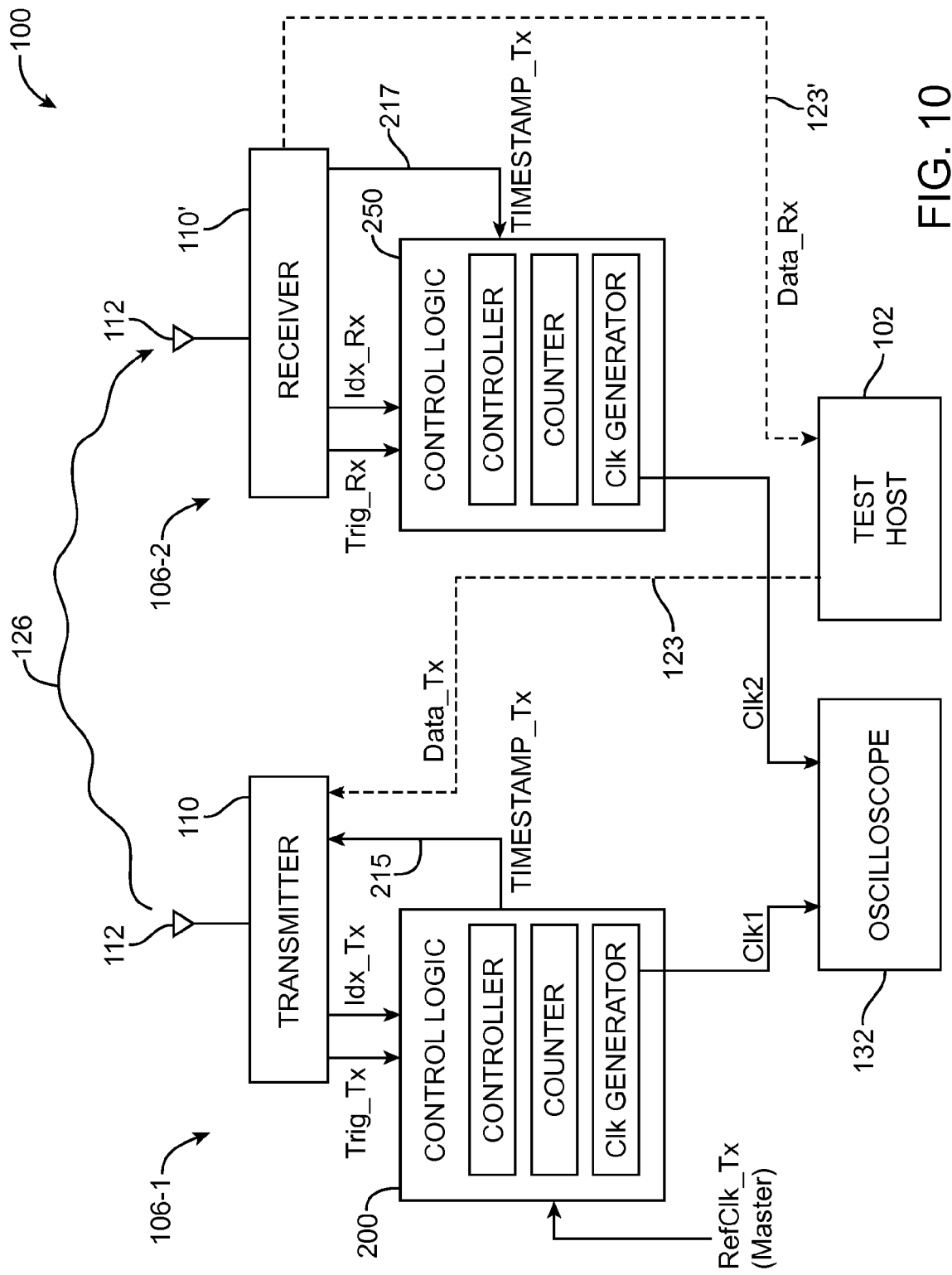
FIG. 10 is a diagram of an illustrative test system that includes multiple test stations, where each test station includes a transmitter/receiver and control logic in accordance with an embodiment of the present invention.

In another suitable arrangement, each test station 106 need not include a processing module (see, e.g., FIG. 10). In test system 100 of FIG. 10, the actions previously performed using Tx processor 208 may be handled by transmitter 110. This requires transmitter 110 to have sufficient processing capability to handle the generation and transmission of both sync packets and timestamp packets when appropriate. As an example, transmitter 110 may transmit a timestamp packet to receiver 110' every clock cycle. As another example, transmitter 110 may transmit a timestamp packet containing one master timestamp sample to receiver 110' in response to sending a synchronization packet. As another example, transmitter 110 may transmit a timestamp packet to receiver 110' when a sufficient number of timestamp samples have been accumulated at transmitter 110. The actions previously performed by RX processor 258 may be handled by control logic 250. This requires control logic 250 to implement a state machine that is programmed to emulate the operations previously executed by test software 260. Control logic 250 may, for example, receive a master timestamp sample in response to receiving a synchronization packet at receiver 110'. As with the test system of FIG. 3, system 100 of FIG. 10 may be capable of sending and receiving normal user data through separate streams established by test host 102 (e.g., Data_Tx may be provided from test host 102 directly to transmitter 110, whereas Data_Rx may be received with test host 102 directly from receiver 110').

The foregoing is merely illustrative of the principles of this invention and various modifications can be made by those skilled in the art without departing from the scope and spirit of the invention. The foregoing embodiments may be implemented individually or in any combination.

What is claimed is:

1. A method for testing master and slave network equipment, the master network equipment comprising a transmitter and a master reference clock, the slave network equipment comprising a receiver and a slave reference clock, the method comprising:
   receiving a synchronization packet comprising first control signals from the transmitter;
   generating and storing at least one master timestamp sample;
   in response to the receiving the synchronization packet from the transmitter, generating second control signals in slave control circuitry;

generating and storing at least one slave timestamp sample based on the second control signals with the slave control circuitry; and comparing the at least one stored master timestamp sample to the at least one stored slave timestamp sample to determine whether the master and slave reference clocks are properly synchronized;

wherein:
the first control signals comprise a transmit trigger signal and a transmit index of the transmitter; and
the second control signals comprise a receive trigger signal and a receive index of the receiver.

2. The method of claim 1, further comprising extracting the receive index from the synchronization packet.

3. The method of claim 1, further comprising:
when the master and slave reference clocks are not synchronized, temporarily tuning the slave reference clock to exhibit an adjusted frequency.

4. The method of claim 1, further comprising:
when the master and slave reference clocks are not synchronized, adjusting a counter to jump to a new count value.

5. A method for testing master and slave network equipment, the master network equipment comprising a transmitter and a master reference clock, the slave network equipment comprising a receiver and a slave reference clock, the method comprising:
receiving a synchronization packet comprising first control signals from the transmitter;
intermittently receiving a timestamp packet comprising a predetermined number of accumulated master timestamp samples;
generating and storing at least one master timestamp sample of the predetermined number of accumulated master timestamp samples;
in response to the receiving the synchronization packet from the transmitter, generating second control signals in slave control circuitry;
generating and storing at least one slave timestamp sample based on the second control signals with the slave control circuitry;
comparing the at least one stored master timestamp sample to the at least one stored slave timestamp sample to determine whether the master and slave reference clocks are properly synchronized.

6. The method of claim 5, wherein the first control signals comprise a transmit trigger signal and a transmit index of the transmitter, and wherein the second control signals comprise a receive trigger signal and a receive index of the receiver.

7. The method of claim 5, further comprising:
when the master and slave reference clocks are not synchronized, temporarily tuning the slave reference clock to exhibit an adjusted frequency.

8. The method of claim 5, further comprising:
when the master and slave reference clocks are not synchronized, adjusting a counter to jump to a new count value.

9. A method for testing master and slave network equipment, the master network equipment comprising a transmitter and a master reference clock, the slave network equipment comprising a receiver and a slave reference clock, the method comprising:
receiving a synchronization packet comprising first control signals from the transmitter;
generating and storing at least one master timestamp sample;

in response to the receiving the synchronization packet from the transmitter, generating second control signals in slave control circuitry;
generating and storing at least one slave timestamp sample based on the second control signals with the slave control circuitry; and
comparing the at least one stored master timestamp sample to the at least one stored slave timestamp sample to determine whether the master and slave reference clocks are properly synchronized;
wherein:
the at least one stored master timestamp sample comprises a master timestamp value and a master index value;
the at least one stored slave timestamp sample includes a slave timestamp value and a slave index value, the slave index value corresponding to the master index value; and
the comparing the at least one stored master timestamp sample to the at least one stored slave timestamp sample comprises computing a difference between the master timestamp value and the slave timestamp value.

10. The method of claim 9, wherein the first control signals comprise a transmit trigger signal and a transmit index of the transmitter, and where the second control signals comprise a receive trigger signal and a receive index of the receiver.

11. The method of claim 9, further comprising:
intermittently receiving a timestamp packet that includes a predetermined number of accumulated ones of the at least one master timestamp sample.

12. The method of claim 9, further comprising:
when the master and slave reference clocks are not synchronized, temporarily tuning the slave reference clock to exhibit an adjusted frequency.

13. A method for testing master and slave network equipment, the master network equipment comprising a transmitter and a master reference clock, the slave network equipment comprising a receiver and a slave reference clock, the method comprising:
receiving a synchronization packet comprising first control signals from the transmitter;
generating and storing at least one master timestamp sample;
in response to the receiving the synchronization packet from the transmitter, generating second control signals in slave control circuitry;
generating and storing at least one slave timestamp sample based on the second control signals with the slave control circuitry;
comparing the at least one stored master timestamp sample to the at least one stored slave timestamp sample to determine whether the master and slave reference clocks are properly synchronized;
generating and storing additional slave timestamp samples; and
in response to the receiving the synchronization packet, comparing the at least one stored master timestamp sample in the synchronization packet to the stored additional slave timestamp samples to determine whether the receiver has failed to receive any synchronization packets from the transmitter.

14. The method of claim 13, wherein the first control signals comprise a transmit trigger signal and a transmit index of the transmitter, and where the second control signals comprise a receive trigger signal and a receive index of the receiver.

15. The method of claim 14, further comprising extracting the receive index from the synchronization packet.

16. The method of claim 13, further comprising:
intermittently receiving a timestamp packet that includes a predetermined number of accumulated master timestamp sample.

17. The method of claim 13, further comprising:
when the master and slave reference clocks are not synchronized, temporarily tuning the slave reference clock to exhibit an adjusted frequency.

18. A method for operating master and slave network equipment, the master network equipment comprising a transmitter and the slave network equipment comprising a receiver, the method comprising:
receiving a timestamp packet from the receiver with a second control logic in the slave network equipment, the slave network equipment comprising a slave reference clock;
in response to receiving a synchronization packet at the receiver, generating and storing slave timestamp samples with the second control logic;
in response to the receiving the timestamp packet from the receiver, comparing the stored slave timestamp samples with at least one master timestamp sample in the received timestamp packet to determine whether a master reference clock and the slave reference clock are properly synchronized; and
receiving synchronization control signals from the transmitter with a first control logic;
wherein the synchronization control signals include a trigger signal and an index signal.

19. The method of claim 18, wherein the timestamp packet comprises the index signal and a counter output.

20. The method of claim 19, wherein:
the counter output corresponds to a number of master timestamp samples that have been accumulated at a master control and processing circuitry;
the timestamp packet includes the accumulated master timestamp samples.

* * * * *